United States Patent [19]

Mincer et al.

[11] Patent Number: 5,262,875
[45] Date of Patent: Nov. 16, 1993

[54] AUDIO/VIDEO FILE SERVER INCLUDING DECOMPRESSION/PLAYBACK MEANS

[75] Inventors: Earl I. Mincer; David L. Siegel, both of Scottsdale, Ariz.

[73] Assignee: Instant Video Technologies, Inc., San Francisco, Calif.

[21] Appl. No.: 876,363

[22] Filed: Apr. 30, 1992

[51] Int. Cl.⁵ .............................................. H04N 5/76
[52] U.S. Cl. .................................................... 358/335
[58] Field of Search .............. 360/15, 33.1; 358/335, 358/342, 85, 86, 133, 134

[56] References Cited

U.S. PATENT DOCUMENTS

| | | | |
|---|---|---|---|
| 4,506,387 | 3/1985 | Walter | 455/612 |
| 4,949,187 | 8/1990 | Cohen | 358/86 |
| 4,963,995 | 10/1990 | Lang | 358/335 |
| 5,014,125 | 5/1991 | Pocock et al. | 358/86 |
| 5,057,932 | 10/1991 | Lang | 358/335 |
| 5,130,792 | 7/1992 | Tindell et al. | 358/85 |
| 5,132,992 | 7/1992 | Yurt et al. | 358/86 |
| 5,157,491 | 10/1992 | Kassatly | 358/85 |

Primary Examiner—Donald E. McElheny, Jr.
Attorney, Agent, or Firm—Earl I. Mincer

[57] ABSTRACT

An audio/video file server includes a storage unit for centrally storing compressed digital audio/video program information, a transceiver for receiving compressed digital audio/video program information from an external source over a less-than-real-time period to update the stored audio/video program information, a plurality of playback units, each associated with an external playback line and an external playback station and each including a decompression unit, for receiving selected compressed digital audio/video program information from the storage unit, for decompressing the selected compressed digital audio/video program information received from the storage unit, and for playing it in real time over the associated playback line to the associated playback station, a network interface unit for receiving playback requests from the playback units, and a processor for controlling the storage and playback units to play the decompressed selected audio/video program information in real time for viewing by users at selected playback stations.

31 Claims, 2 Drawing Sheets

AUDIO/VIDEO FILE SERVER INCLUDING DECOMPRESSION/PLAYBACK MEANS

REFERENCE TO RELATED APPLICATION AND PATENTS

This application is related to, and incorporates by reference the subject matter of, commonly owned U.S. Pat. No. 4,963,995 entitled AUDIO/VIDEO TRANSCEIVER APPARATUS INCLUDING DECOMPRESSION MEANS issued Oct. 16, 1990, commonly owned U.S. Pat. No. 5,057,932 entitled AUDIO/VIDEO TRANSCEIVER APPARATUS INCLUDING COMPRESSION MEANS, RANDOM ACCESS STORAGE MEANS, AND MICROWAVE TRANSCEIVER MEANS issued Oct. 15, 1991, and commonly owned pending U.S. patent application Ser. No. 07/775,182 entitled AUDIO/VIDEO RECORDER/TRANSCEIVER filed Oct. 11, 1991, now U.S. Pat. No. 5,164,839.

BACKGROUND AND SUMMARY OF THE INVENTION

File servers are well known in the art to designate computer equipment having some type of mass storage device, typically a magnetic hard disk, that is connected to a network and utilized as central storage for multiple users via the network. The information that is typically stored on such a system consists of binary computer data such as executable programs and corresponding data. Exemplary of the types of corresponding data stored are numbers for spreadsheets, ASCII characters and codes for word processors, and drawing commands for drawing and CAD programs. These or similar types of data do not have a time element associated with them nor do they require any extra processing beyond the usual interpretation that is accomplished by the computer program with which they are intended to be used.

In contrast, the playback of audio/video information has a time element associated with its use. Furthermore, the amount of data required to store audio/video program information in digital form is currently prohibitive. Thus, it is common to employ audio/video compression techniques to reduce the audio/video program information before it is stored. As a result, further processing in the form of decompression and digital-to-analog conversion is required before the real-time viewing of an audio/video program can take place. Decompression may be accomplished through the use of known hardware or software techniques. Digital-to-analog conversion may be required, depending on the type of equipment used for viewing the audio/video program. A known audio/video file server apparatus manufactured and marketed by Protocomm of Trevose, Pa. permits real-time playback of compressed audio/video program information. However, this prior art apparatus is disadvantageous in that it does not include any capability for less-than-real-time reception of audio/video program information for updating the audio/video program information stored therein. In addition, the hardware for accomplishing playback of stored audio/video program information is duplicated at each user station, rather than centrally located within the audio/video file server.

It is therefore the principal object of the present invention to provide a self-contained audio/video file server for receiving compressed digital audio/video program information over a time period that is less than a real time period required for viewing the audio/video program information, for centrally storing the compressed digital audio/video program information, and for selectively decompressing the stored audio/video program information and playing the selectively decompressed audio/video program information in real time to an external playback station that has requested it.

This and other objects are accomplished in accordance with the illustrated preferred embodiment of the present invention by providing a storage unit for centrally storing compressed digital audio/video program information, a transceiver for receiving compressed digital audio/video program information from an external source over a less-than-real-time period to update the stored audio/video program information, a plurality of playback units, each associated with an external playback line and an external playback station and each including a decompression unit, for receiving selected compressed digital audio/video program information from the storage unit, for decompressing the selected compressed digital audio/video program information received from the storage unit, and for playing it in real time over the associated playback line to the associated playback station, a network interface unit for receiving playback requests from the playback units, and a processor for controlling the storage and playback units to play the decompressed selected audio/video program information in real time for viewing by users at selected playback stations.

DESCRIPTION OF THE PREFERRED EMBODIMENT

Figure 1:
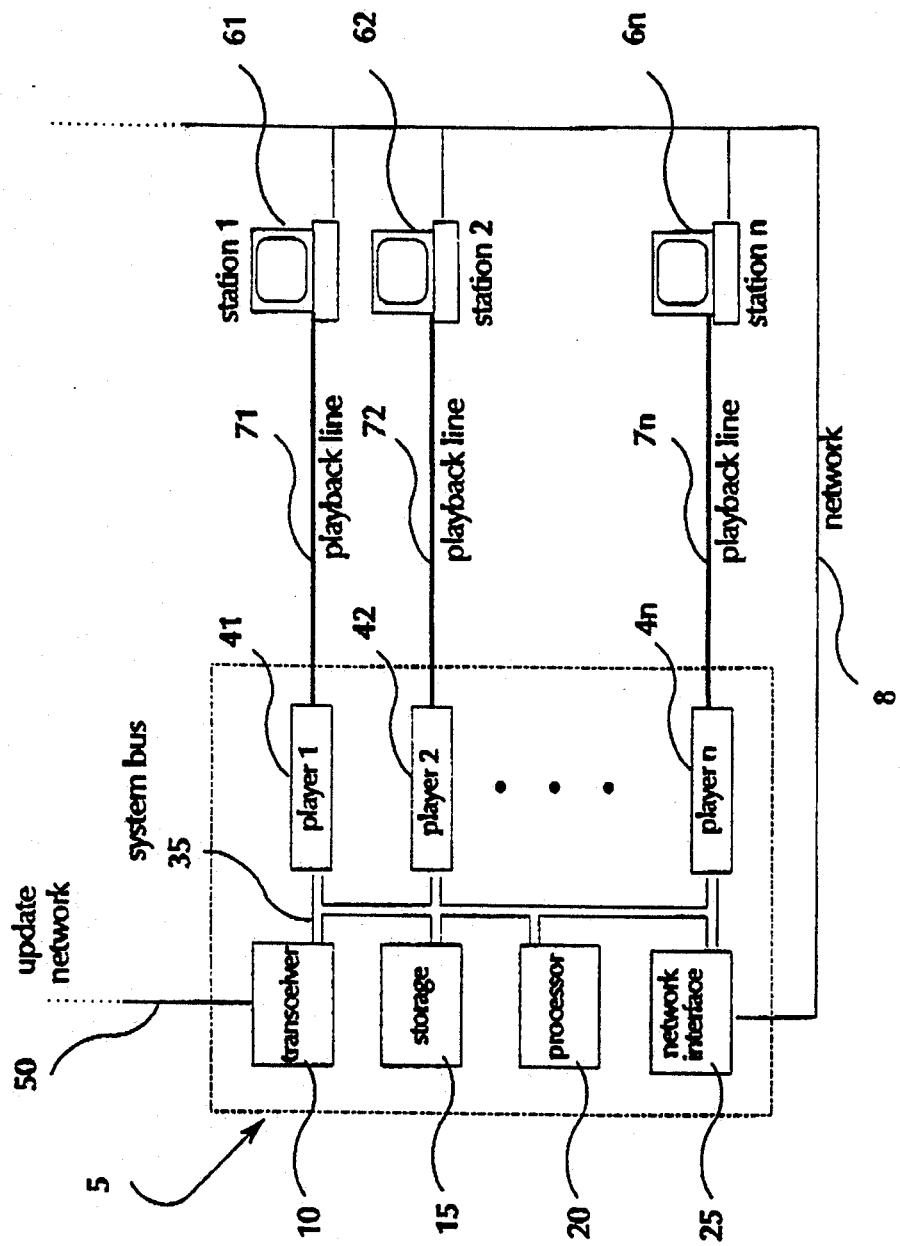
FIG. 1 is a functional block diagram of an audio/video file server constructed in accordance with the present invention.

Referring now to FIG. 1, there is shown an audio/video file server 5 within a characteristic network 8. Audio/video file server 5 comprises a transceiver 10, a storage unit 15, a processor 20, a network interface 25, a system bus 35, and a plurality of playback units 41, 42 . . . 4n. Audio/video file server 5 is connected to update network 50, network 8, and stations 61, 62 . . . 6n via corresponding playback lines 71, 72 . . . 7n. Audio/video file server 5 may be based on a commercially available VME platform such as the Hybricon Series 10-21. This selection defines system bus 35. As commonly supplied, the Hybricon platform comprises a system bus, shassis, power supply, and support hardware required to construct a VME-based computer system. Other hardware may be added to this system in the form of plug-in computer cards. A CPU card such as the Heurikon HK68/V4F includes a processor that may function as processor 20, an Ethernet network interface that may function as network interface 25, and a SCSI controller that may serve to control storage unit 15. Storage unit 15 itself may comprise a Fujitsu M2380A disk drive. A conventional satellite link may be employed as update network 50, and transceiver 10 may comprise a satellite modem such as the SDM-308 satellite modem manufactured and marketed by EFData of Tempe, Ariz. Playback units 41, 42 . . . 4n may comprise any of a number of commercially available digital video compression/decompression boards such as the Intel ActionMedial 750, the Visionary board marketed by Rapid Technology of Amherst, N.Y. or the VSA-1000 board marketed by Fluent Machines of Framingham, Mass.

Transceiver 10 includes a connection to update network 50. Update network 50 is operative for transmitting audio/video program information in compressed digital form in less than real time from a disparate apparatus to audio/video file server 5 for storage in storage unit 15. Any audio/video programs stored in storage unit 15 are then available for playback through a selected one of the playback units 4, 41 ... 4n. The request for playback of a stored program is made to audio/video file server 5 from one of the stations 61, 62 ... 6n. The request is in the form of digital data sent to audio/video file server 5 via network 8. Network interface 25 is operative for interfacing with network 8 and for making the data available to processor 20. Processor 20 is operative for controlling all system operations of audio/video file server 5, including the interpretation of the request just received by network 25 in accordance with the foregoing example. System bus 35 interconnects transceiver 10, storage unit 15, processor 20, network interface 25, and player units 41, 42 ... 4n. Processor 20, having received a request from one of stations 61, 62 ... 6n for playback of a selected audio/video program stored in storage unit 15, initiates retrieval of the selected program from storage unit 15. Processor 20 then initiates playback of the selected program through one of the playback units 41, 42 ... 4n. Upon initiating playback, processor 20 remains substantially free for ongoing control of the system. When one of the playback units 41, 42 ... 4n has been initiated for playback, it receives compressed digital audio/video program information from storage unit 15 via system bus 35. Depending on the capabilities of the selected one of playback units 41, 42 ... 4n, the amount of data received may vary. The selected one of playback units 41, 42 ... 4n buffers the compressed digital audio/video program information in its own storage and begins real-time decompression and digital-to-analog conversion of the compressed digital audio/video program information for playback. Each one of the playback units 41, 42 ... 4n must operate at a certain bit rate in order to maintain real-time playback. For example, a current reasonable compressed digital bit rate is 1.2 Mbits/second. This bit rate corresponds to the bit rate of compressed digital audio/video program information that, when decompressed and viewed, corresponds to real-time program playback.

The total number of playback units 41, 42 ... 4n that audio/video file server may service is determined in part by the rate at which compressed digital audio/video program information may be read from storage unit 15. For example, if storage unit 15 comprises a magnetic disk drive capable of sustaining a 12 Mbit/second data rate for reading, and each one of playback units 41, 42 ... 4n requires only 1.2 Mbits/second, then audio/video file server may provide service ten of playback units 41, 42 ... 4n simultaneously. The physical nature of the selected storage media must also be considered. In other words, overhead for the operation of storage unit 15 must be taken into account. In the previous example in which storage unit 15 comprises a magnetic disk storage unit, the magnetic disk is required to concurrently read ten distinct 1.2 Mbit/second channels (one for each of playback units 41, 42 ... 4n), which totals the maximum sustained data rate of 12 Mbits/second for the disk drive. This may be the case for disk drives that use parallel heads. Alternatively, the storage media may be suitable for other methods of realizing parallel read channels, such as the case where RAM is used. In such an embodiment, the RAM layout and the address lines connected to the RAM storage may be designed to operate using separate blocks of RAM concurrently, in parallel. But in the foregoing example in which storage unit 15 comprises a commercially available magnetic disk drive, the operation is somewhat different. In that case, storage unit 15 operates near its maximum sustainable read rate of 12 Mbits/second and the selected one of playback units 41, 42 ... 4n receives the compressed digital audio/video program information at the same rate using onboard buffer storage until some predetermined amount of the buffer storage is filled. Thus, storage unit 15 is free to service another one of playback units 41, 42 ... 4n immediately upon having filled the buffer of the previously serviced one of playback units 41, 42 ... 4n. At that time, the previously service one of playback units 41, 42 ... 4n may begin playback of the compressed digital audio/video program information at a real-time rate. In the current example, storage unit 15 services each request ten times faster than is required. Each playback unit is serviced at 12 Mbits/second even though only 1.2 Mbits/second is required. Therefore, storage unit 15 may service the other nine playback units 41, 42 ... 4n before it is required to become available for the previously serviced one of playback units 41, 42 ... 4n in order to refill its buffer to maintain real-time playback. In this fashion, the sustainable data rate at which compressed digital audio/video program information may be read from storage unit 15 divided by the required real-time compressed digital audio/video program information bit rate approximates the number of playback units 41, 42 ... 4n that may be serviced.

In accordance with the above description, two embodiments for storage unit 15 are possible. In the embodiment in which storage unit 15 comprises RAM, it is capable of servicing several parallel concurrent read requests. In that case, storage unit 15 is employed to concurrently read data in n distinct channels to each of the playback units 41, 42 ... 4n for real-time playback. In the preferred embodiment, storage unit 15 is capable of maintaining a higher data read rate than that required for real-time playback and, thus, fills internal buffers in playback units 41, 42 ... 4n at the higher data rate. Storage unit 15 is thereby free to service other read requests to other of the playback units 41, 42 ... 4n. In effect, this embodiment use time-division multiplexing in accessing storage unit 15.

Transceiver 10 is also operative for less-than-real-time reception of audio/video program information. Such reception is utilized for updating the audio/video program information stored in storage unit 15 in a fast and convenient manner. Update network 50 is connected to transceiver 10, which is employed to communicate with a disparate apparatus capable of transmitting compressed digital audio/video program information. The amount of compressed digital audio/video program information that is being transmitted and the speed at which update network 50 operates determines the total transmission time required. In the preferred embodiment of the present invention, update network 50 is substantially faster than the corresponding real-time data rate of the compressed digital audio/video program information, thus resulting in transmission times that are substantially less than the viewing time corresponding to the audio/video program information. Current sample bit rates in the industry include a 1.2 Mbit/second rate for compressed digital audio/video program information (i.e., one second of viewing time corresponds to 1.2 Mbits of data) and a 12 Mbit/second data rate for update network 50. In this example, audio/video program information is received in one-tenth of real time. That is, a 30-second audio/video program is received in three second. Transmission media for update network 50 may comprise, for example, fiber, coax, one or more satellite channels, one or more broadcast TV channels, or microwave.

The compression method employed in connection with the transmitted audio/video program information may comprise, for example, Intel's DVI method, Phillips' CD-I method, compression by C-Cube Microsystems, compression by General Instruments, proposed still-frame compression standard JPEG, or proposed motion-picture compression standard MPEG. After it is received by transceiver 10, the compressed digital audio/video program information is stored in storage unit 15. Playback units 41, 42 ... 4n employ a decompression technique that corresponds to the compression technique employed in connection with the compressed digital audio/video program information stored in storage unit 15. In fact, it is preferred to store digital audio/video program information in accordance with any known compression method and to provide at least one of the playback units 41, 42 ... 44n with the ability to decompress any such stored compressed digital audio/video program information. This ability may be accomplished by designing playback units 41, 42 ... 4n to programmably decompress digital audio/video program information previously compressed in accordance with any of a number of compression techniques. Alternatively, different types of playback units 41, 42 ... 4n by be provided, each of which is capable of decompressing digital audio/video program information previously compressed in accordance with a particular compression different technique. In the latter case, processor 20 is operative for directing playback of compressed digital audio/video program information only to compatible ones of playback units 41, 42 ... 4n.

Network 8 is connected to network interface 25 for transmitting instructions to transceiver 10 from any one of stations 61, 62 ... 6n connected thereto. These instructions are communicated to audio/video file server 5 through network 8 and are received by network interface 25. These instructions are available to processor 20 through system bus 35. Network 8 may comprise any of a number of well known networks such as Ethernet, FDDI (Fiber Distributed Data Interface), or token ring. Network interface 25 is selected to be compatible with network 8. Multiple networks may be employed, in which case corresponding multiple network interfaces are required. The instructions transmitted by network 8 comprise predetermined data that processor 20 is conventionally programmed to recognize. For example, the ASCII data string "PLAY 324 00-321-732" may be received by processor 20 as a request to play stored audio/video program number 324 to the station located at address 00-321-732 on network 8. In this example, address 00-321-732 corresponds to a particular one of stations 61, 62 ... 6n on network 8. That station is connected to audio/video file server 5 by one of playback lines 71, 72 ... 7n as well as to network 8. Processor 20 is conventionally programmed to recognize the correspondence between a particular address and one of the playback lines 71, 72 ... 7n. Simple commands and address interconnections such those described hereinabove may be defined in accordance with known microprocessor programming techniques to control audio/video file server 5.

Figure 2:
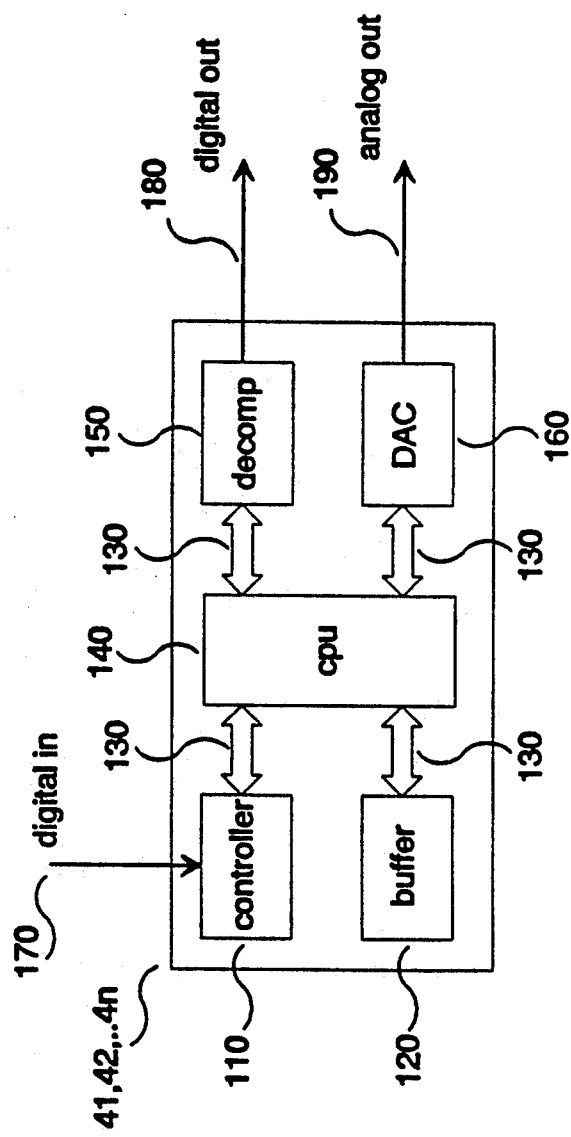
FIG. 2 is a block diagram of one of the plurality of playback units employed in the audio/video file server of FIG. 1.

The details of one of playback units 41, 42 ... 4n may be understood with reference to FIG. 2. Playback units 41, 42 ... 4n may comprise any of a number of commercially available digital audio/video playback products, including those marketed by Intel, IBM, and Fluent Machines, for example. Each of the playback units 41, 42 ... 4n comprises a controller 110, a buffer 120, a bus 130, a CPU 140, a decompressor 150, and a DAC 160. Compressed digital audio/video program information is received by a selected one of the playback units 41, 42 ... 4n via digital input 170. Uncompressed real-time digital audio/video program information is provided on output line 180. The same digital audio/video program information may be routed to DAC 160 for digital-to-analog conversion controlled by CPU 140. The resultant analog audio/video program information is provided on output line 190.

Compressed digital audio/video program information is received by controller 110 at digital input 170. Controller 110 controls, communicates with, and receives data from storage unit 15 of FIG. 1. Controller 110 may comprise, for example, any of a number of commercially available SCSI controller chips, to receive digital audio/video program information at a high sustained data transfer rate from storage unit 15 of FIG. 1. This information is transferred to a buffer 120 that may comprise commercially available DRAM, for storage. As explained above, storage of information in buffer 120 is necessary to accommodate the difference in data transmission speeds between storage unit 15, which preferably operates at a data transfer rate higher than the required real-time digital bit rate and the real-time digital bit rate of the selected one of playback units 41, 42 ... 4n. In this manner, buffer 120 is filled at the higher data transfer rate under software control by CPU 140 in cooperation with controller 110. Alternatively, the data transfer rate from storage unit 15 of FIG. 1 and the playback rate of a selected one of the playback units 41, 42 ... 4n may be the same, in which case buffer 120 may not be required. In the event buffer 120 is utilized, real-time digital playback may be invoked by CPU 10 at any time following storage of a minimum amount of program information in buffer 120. The playback operation involves CPU control of decompressor 150, which decompresses the stored digital audio/video program information using the same algorithm chosen to initially compress the audio/video program information. As stated above, this algorithm may be selectable using programmable decompression chips such as the Vision Processor marketed by Integrated Information Technology, Inc. of Santa Clara, Calif.

Decompression by decompressor 150 produces real-time digital audio/video program information. Using appropriate digital display devices, this audio/video program information may be viewed following formatting for the particular display device through use of a conventional converter. Commercially available integrated circuits may be employed to convert the real-time digital audio/video program information to a variety of signals, such as digital RGB or digital HDTV. Depending on the particular display device used, audio signals may be routed to separate speakers.

Alternatively, the real-time digital audio/video program information may be further converted to an analog signal by DAC 160. In some cases, this analog signal requires further conventional conversion for use by the selected display device, such as a VGA or NTSC device.

While each of the playback units 41, 42 . . . 4n operates as described above, multiple playback units 41, 42 . . . 4n are housed in audio/video file server 5, with coaxial cable playback lines 71, 72 . . . 7n connecting the appropriate one of outputs 180, 190 to the associated one of playback stations 61, 62 . . . 6n.

In use, storage unit 15 of audio/video file server 5 is updated with compressed digital audio/video program information in a less-than-real-time mode via update network 50. Update network 50 may comprise a satellite network in cooperation with a satellite modem within transceiver 10, a magnetic hard disk as storage unit 15, and Intels DVI compression algorithms. The satellite modem operates at approximately 8 Mbits/second. Since the required digital bit rate for real-time audio/video playback for DVI is approximately 1.2 Mbits/second, it follows that use of an 8 Mbit/second satellite link results in transmission times approximating six time faster than real time. For example, if sixty seconds of audio/video program information are compressed prior to transmission, this information is received by transceiver 10 in approximately 10 seconds. The reception of this information may be initiated by the user through a user-interface controlled by processor 20 in which commands such as RECEIVE may be selected through the use of a menu presented on a display device or a dedicated key on a keyboard input unit.

In the event a fixed-position satellite dish is employed to receive compressed digital audio/video program information for updating audio/video file server 5, conventional communication is provided by audio/video file server 5 to the control electronics of the satellite dish. The compressed digital audio/video program information is received by transceiver 10 and transferred to storage unit 15 over system bus 35 under control of processor 20. After reception is completed, as indicated by predefined data that processor 20 is programmed to recognize or as indicated by the end of the incoming signal, processor 20 may prompt the user for further information, such as an alphanumeric name for association with the audio/video program information just received. This information may be entered by the user through a conventional keyboard. In this way, the user may initiate faster-then-real-time reception of audio/video program information to update the audio/video program information already stored in storage unit 15. Alternatively, updating may be accomplished under control of a transmitting station, without requiring any interaction from the user of audio/video file server 5. Such a feature is useful for automatically updating the audio/video program information stored in audio/video file server 5 during those times when it is typically not in use.

After audio/video program information has been loaded into storage unit 15 of audio/video file server 5, it is available for playback to a selected one of the playback stations 61, 62 . . . 6n. Playback may be initiated through a user request from one of the playback stations or through direct interaction with audio/video file server 5. In the latter case, a simple user interface, such as a menu interface, may be employed for selection of the desired program information and the playback station. For example, a menu of the available items of audio/video program information, as named by the user or by the system, may be presented. The user may make a selection through cursor control keys on a keyboard. Similarly, the system will have been installed with address names indicating the existing playback stations 61, 62 . . . 6n, through use of which a desired playback station is selected. Using this selection information, processor 20 may initiate playback by communicating the selected one of playback units 41, 42 . . . 4n via system bus 35, after which processor 20 is available for further user interaction, such as additional playback requests.

Audio/video file server 5 may be controlled by user-actuation of conventional VCR-like keys such as STOP, PLAY, and PAUSE that may be provided on a user interface. Since audio/video file server 5 includes computer components such as a processor, VME platform, and hard disk, all of the functions described hereinabove may be automated or controlled remotely by an operator or a computer.

Playback of selected audio/video program information from file server 5 may be initiated by one of the playback stations 61, 62 . . . 6n. This is accomplished by transmitting predefined instructions to audio/video file server 5 via network 8. As stated above, network interface 25 may be realized through the use of a VME processor card and is typically an Ethernet interface. Thus, playback stations 61, 62 . . . 6n transmit their requests via Ethernet. Typically, each of playback stations 61, 62 . . . 6n is a computer system with an optional television monitor for optional NTSC playback as opposed to VGQ playback and an Ethernet network interface. Playback requests need not be limited to a single one of playback stations 61, 62 . . . 6n requesting playback to only itself. Any one of the playback stations 61, 62 . . . 6n may request playback to any one or more of the playback stations. Furthermore, it is not necessary that each of the playback stations 61, 62 . . . 6n include an interface to network 8. Rather, one or more of the playback stations 61, 62 . . . 6n may include display devices for playback, in which case a playback request must have been initiated elsewhere from a device on network 8 or possibly from audio/video file server 5 itself.

As described above, the playback instruction which audio/video file server 5 recognizes may be implementation defined. That is, the instruction may comprise simple commands that denote the instruction to be performed, such as PLAY, STOP, and PAUSE, for example, the selected program information in the form of an ASCII name or a program number, and information which identifies the desired playback station, such as its network address. These simple commands may be transmitted via network 8 and may be encoded in alphanumeric characters or in any other predefined format. The only requirement for the command format is that processor 20 be programmed to recognize each of the commands.

In summary, playback of audio/video program information stored in audio/video file server 5 may be initiated at audio/video file server 5 through either a menu-driven or keyboard user interface. Alternatively, playback may be initiated by any one of the playback stations 61, 62 . . . 6n sending a command via network 8. In both cases, the audio/video program information stored in storage unit 15 of audio/video file server 5 may be updated in less than real time via transceiver 10, which may also be employed to transmit stored audio/video program information to other ones of audio/video file server 5. Playback commands are received by network interface 25 and interpreted by processor 20.

We claim:

1. An audio/video file server for decompressing and distributing selected audio/video program information stored in a compressed digital format within the file server to one or more external playback stations for real-time viewing by users at those playback stations, the audio/video file server comprising:

storage means for storing compressed digital audio/video program information;

transceiver means, connected to the storage means, for receiving compressed digital audio/video program information from an external source over a time period that is less than a real time period required to view the audio/video program information to thereby update the compressed digital audio/video program information stored in the storage means;

a plurality of playback units, each associated with an external playback line and an external playback station and each including decompression means, for receiving selected compressed digital audio/video program information stored in the storage means, for decompressing the selected compressed digital audio/video program information received from the storage means, and for playing the decompressed selected audio/video program information in real time over the associated playback line to the associated playback station;

network interface means, connected to the storage means, transceiver means, playback units, and plurality of playback stations, for receiving playback requests from the plurality of playback stations; and processing means, connected to the storage means, transceiver means, playback units, and network interface means, the processing means being responsive to the network interface means, following receipt of a playback request, for controlling the associated playback unit to play the decompressed selected audio/video program information in real time.

2. An audio/video file server as in claim 1 further comprising bus means interconnecting said transceiver means, storage means, processing means, network interface means, and plurality of playback units.

3. An audio/video file server as in claim 1 wherein said transceiver means comprises a satellite transceiver.

4. An audio/video file serve as in claim 1 wherein said transceiver means comprises a fiber optic transceiver.

5. An audio/video file server as in claim 1 wherein said transceiver means comprises a microwave transceiver.

6. An audio/video file server as in claim 1 wherein said transceiver means comprises a broadcast television transceiver.

7. An audio/video file server as in claim 1 wherein said transceiver means comprises a cable television transceiver.

8. An audio/video file server as in claim 1 wherein said transceiver means comprises a telephone line transceiver.

9. An audio/video file server as in claim 1 wherein said storage means comprises one or more magnetic disks.

10. An audio/video file server as in claim 1 wherein said storage means comprises one or more optical disks.

11. An audio/video file server as in claim 1 wherein said storage means comprises semiconductor memory.

12. An audio/video file server as in claim 1 wherein said storage means comprises magnetic tape.

13. An audio/video file server as in claim 1 wherein said storage means comprises optical tape.

14. An audio/video file server as in claim 1 wherein said network interface means comprises an ethernet interface.

15. An audio/video file server as in claim 1 wherein said network interface means comprises a token ring interface.

16. An audio/video file server as in claim 1 wherein said network interface means comprises a token ring interface.

17. An audio/video file server as in claim 2 wherein said transceiver means comprises a satellite transceiver.

18. An audio/video file server as in claim 2 wherein said transceiver means comprises a fiber optic transceiver.

19. An audio/video file server as in claim 2 wherein said transceiver means comprises a microwave transceiver.

20. An audio/video file server as in claim 2 wherein said transceiver means comprises a broadcast television transceiver.

21. An audio/video file server as in claim 2 wherein said transceiver means comprises a cable television transceiver.

22. An audio/video file server as in claim 2 wherein said transceiver means comprises a telephone line transceiver.

23. An audio/video file server as in claim 2 wherein said storage means comprises one or more magnetic disks.

24. An audio/video file server as in claim 2 wherein said storage means comprises one or more optical disks.

25. An audio/video file server as in claim 2 wherein said storage means comprises semiconductor memory.

26. An audio/video file server as in claim 2 wherein said storage means comprises magnetic tape.

27. An audio/video file server as in claim 2 wherein said storage means comprises optical tape.

28. An audio/video file server as in claim 2 wherein said network interface means comprises an ethernet interface.

29. An audio/video file server as in claim 2 wherein said network interface means comprises an FDDI interface.

30. An audio/video file server as in claim 2 wherein said network interface means comprises a token ring interface.

31. A method for receiving and storing audio/video program information in a compressed digital format in an audio/video file server and for selectively distributing said stored audio/video file server and for selectively distributing said stored audio/video program information to a plurality of remotely located playback stations for real time viewing by users of the playback stations, the method comprising the steps of:

receiving audio/video program information in compressed digital form at the audio/video file server from a remotely located source over a burst time period that is less than a real time period required to view the audio/video program information;

storing, in the audio/video file server, the compressed digital audio/video program information so received;

providing a network interface between the audio/video file server and the plurality of playback stations for receiving one or more playback requests from the plurality of playback stations and for controlling the plurality of playback stations in response thereto;

processing the one or more playback requests received by said network interface;

selectively decompressing, in the audio/video file serve, the stored compressed digital audio/video program information in accordance with the one or more processed playback requests; and selectively controlling the plurality of playback stations to play, in real time, the selectively decompressed audio/video program information in accordance with the one or more playback requests.

* * * * *